(12) United States Patent
Chen et al.

(10) Patent No.: US 11,301,247 B2
(45) Date of Patent: Apr. 12, 2022

(54) SYSTEM AND METHOD FOR HANDLING FLOATING POINT HARDWARE EXCEPTION

(71) Applicant: Marvell Asia Pte, Ltd. (Registration No. 199702379M), Singapore (SG)

(72) Inventors: Chia-Hsin Chen, Santa Clara, CA (US); Avinash Sodani, San Jose, CA (US); Ulf Hanebutte, Gig Harbor, WA (US); Rishan Tan, San Jose, CA (US); Soumya Gollamudi, San Jose, CA (US)

(73) Assignee: Marvell Asia Pte Ltd, Singapore (SG)

( * ) Notice: Subject to any disclaimer, the term of this patent is extended or adjusted under 35 U.S.C. 154(b) by 65 days.

(21) Appl. No.: 16/864,069

(22) Filed: Apr. 30, 2020

(65) Prior Publication Data

US 2021/0191719 A1 Jun. 24, 2021

Related U.S. Application Data

(60) Provisional application No. 62/950,626, filed on Dec. 19, 2019.

(51) Int. Cl.
| G06F 7/499 | (2006.01) |
| G06F 9/30 | (2018.01) |
| G06F 7/485 | (2006.01) |
| G06F 9/38 | (2018.01) |

(52) U.S. Cl.
CPC .......... G06F 9/3001 (2013.01); G06F 7/485 (2013.01); G06F 7/49905 (2013.01); G06F 9/3865 (2013.01)

(58) Field of Classification Search
CPC .................. G06F 7/49905; G06F 7/49921
See application file for complete search history.

(56) References Cited

U.S. PATENT DOCUMENTS

| 5,886,915 A * | 3/1999 | Sharangpani ....... G06F 9/30189 708/495 |
| 6,701,427 B1 * | 3/2004 | Hinds ................. G06F 7/49905 708/506 |
| 2007/0257824 A1 * | 11/2007 | Harada ................ G10L 19/035 341/51 |
| 2014/0195581 A1 * | 7/2014 | Wilkins .................. G06F 7/535 708/653 |
| 2019/0163476 A1 * | 5/2019 | Valentine ............ G06F 9/30094 |

* cited by examiner

*Primary Examiner* — Chuong D Ngo

(57) ABSTRACT

A method includes receiving an input data at a FP arithmetic operating unit configured to perform a FP arithmetic operation on the input data. The method further includes determining whether the received input data generates a FP hardware exception responsive to the FP arithmetic operation on the input data, wherein the determining occurs prior to performing the FP arithmetic operation. The method also includes converting a value of the received input data to a modified value responsive to the determining that the received input data generates the FP hardware exception, wherein the converting eliminates generation of the FP hardware exception responsive to the FP arithmetic operation on the input data.

36 Claims, 6 Drawing Sheets

SYSTEM AND METHOD FOR HANDLING FLOATING POINT HARDWARE EXCEPTION

RELATED APPLICATIONS

The present application is a Nonprovisional U.S. application that claims the benefit and priority to the Provisional U.S. Application No. 62/950,626 that was filed on Dec. 19, 2019, which is incorporated herein by reference in its entirety.

BACKGROUND

Machine learning (ML) systems are generally computationally intensive and generally perform large amounts of floating point (FP) operations. FP arithmetic operators for the FP operations are generally compliant with IEEE-754 standard. FP hardware exceptions are generated when input to and/or output from a FP arithmetic operator is one of positive infinity, negative infinity, a signaling not-a-number (SNAN), etc. Large amounts of resources are typically needed for handling large numbers of FP hardware exceptions being generated from large numbers of FP operations in the ML systems. Moreover, additional resources are needed to handle circumstances where the input to or output from the FP arithmetic operators is a denormal number or when the input is a quiet not-a-number (QNAN), SNAN, infinity, etc. Denormal number refers to a non-zero number in floating point arithmetic where its magnitude is smaller than the smallest normal number Currently, additional data paths are often needed for each FP arithmetic operator to handle the values of inputs or outputs with denormal numbers, QNANs, SNANs, infinities, etc. These additional data paths result in a larger footprint, higher power consumption, and increase in complexity of the ML systems.

The foregoing examples of the related art and limitations related therewith are intended to be illustrative and not exclusive. Other limitations of the related art will become apparent upon a reading of the specification and a study of the drawings.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
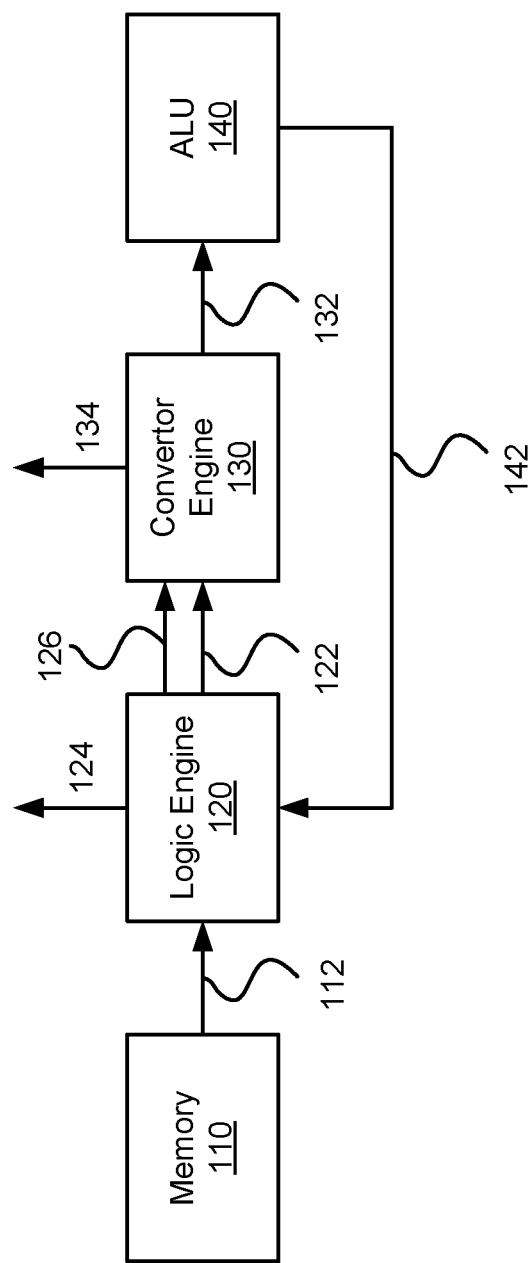
FIG. 1 depicts an illustrative example of an architecture configured to efficiently handle FP hardware exception according to one aspect of the present embodiments.

The following disclosure provides many different embodiments, or examples, for implementing different features of the subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Before various embodiments are described in greater detail, it should be understood that the embodiments are not limiting, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein. It should also be understood that the terminology used herein is for the purpose of describing the certain concepts, and the terminology is not intended to be limiting. Unless defined otherwise, all technical and scientific terms used herein have the same meaning as commonly understood in the art to which the embodiments pertain.

According to some embodiments, input data to a FP arithmetic operator of a ML system is modified in order to avoid generating one or more FP hardware exceptions. For a non-limiting example, value of the input data (i.e. operand) for the FP arithmetic operator is replaced with a maximum supported number or a minimum supported number of the system when the input data is a positive infinity or negative infinity respectively. Moreover, when an input data for a FP arithmetic operator is an SNAN, the input data may be replaced with a zero. As such, the input data as modified would not generate a FP hardware exception resulting from its original value, e.g., positive infinity, negative infinity, an SNAN, etc. Furthermore, the input data may be manipulated to handle other circumstances such as denormal numbers, QNAN inputs, etc., which may not cause a FP hardware exception but nonetheless may require additional data path for each FP arithmetic operator to handle the circumstances. In some non-limiting examples, an input data being a denormal number or being a QNAN input may be replaced with zero. Accordingly, the need for additional data paths for each FP arithmetic operator to handle the FP hardware exception or to handle denormal numbers or a QNAN input is eliminated.

In some embodiments, the output of the FP arithmetic operator, e.g., addition, subtraction, add-reduce, multiplication, negation, maximum, minimum, max-reduce, min-reduce, division, FPx to FPy (where x>y), FPx to FPy (where x<y), FP to integer (Int), etc., is similarly monitored and replaced in order to avoid additional data paths for each FP arithmetic operator. For a non-limiting example, even if the input data into the FP arithmetic operator may not cause a FP hardware exception or a special circumstance handling, the output may nonetheless require special handling. As an illustrative example, two input operands may each be within the supported numerical range but when added together may be greater than the maximum supported number, thereby generating infinity and requiring a special handling or generating a FP hardware exception. Accordingly, the output of a FP operator may be replaced with a maximum supported number if the FP operator results in positive infinity. Similarly, the output of a FP operator may be replaced with a minimum supported number if the FP operator results in negative infinity.

It is appreciated that in some nonlimiting examples the number of FP hardware exceptions being generated is reduced. In some nonlimiting examples, the output of a FP operator may be replaced with zero if the output is a denormal number. It is appreciated that the discussion of the operations with respect to addition is merely for illustration purposes and should not be construed as limiting the scope of the embodiments. For example, similar process may take place for other operations, such as subtraction, add-reduce, multiplication, negation, maximum, minimum, max-reduce, min-reduce, division, FPx to FPy (where x>y), FPx to FPy (where x<y), FP to Int, etc.

Accordingly, the need for additional data paths for each FP arithmetic operator to handle the FP hardware exceptions or to handle denormal, infinity, SNAN or QNAN input is eliminated. Thus, hardware footprint, power consumption, and complexity are reduced.

FIG. 1 depicts an illustrative example of an architecture configured to efficiently handle FP hardware exception according to one aspect of the present embodiments. In some embodiments, a memory 110 is coupled to a logic engine 120, which is coupled to a convertor engine 130, which is further coupled to an arithmetic logic unit (ALU) 140. The ALU 140 is a FP arithmetic operator/operating unit configured to perform one or more FP arithmetic operations, e.g., addition, subtraction, add-reduce, multiplication, negation, maximum, minimum, max-reduce, min-reduce, division, FPx to FPy (where x>y), FPx to FPy (where x<y), FP to Int, etc., for a ML operation. According to some embodiments, the memory 110 stores data, e.g., numerical data, non-numerical number, etc. In some embodiments, one or more operand for a FP arithmetic operation is stored in the memory 110. It is appreciated that the operand(s) for the FP arithmetic operation may be fetched and transmitted as an input data 112. The logic engine 120 receives the input data 112. The logic engine 120 is configured to parse the input data 112 to determine whether the input data 112, as received, would result in a generation of a FP hardware exception once operated on by the ALU 140. For a non-limiting example, the logic engine 120 is configured to determine whether the input data 112 is positive infinity, negative infinity, an SNAN, etc. In other words, the logic engine 120 is configured to determine whether a FP hardware exception would be generated prior to the FP arithmetic operator operates on the input data (i.e. determined apriori). Furthermore, the logic engine 120 may be configured to determine whether the input data 112 would require a special handling once it is operated on by the ALU 140, e.g., QNAN, denormal number, etc. It is appreciated that the logic engine 120 may be implemented in software according to one nonlimiting example. However, it is appreciated that the logic engine 120 may be implemented in hardware in some embodiments. As such, discussion of the embodiments with respect to software implementation is for illustrative purposes only and should not be construed as limiting the scope of the embodiments.

In some embodiments, the logic engine 120 may transmit the results of its determination 122 to the convertor engine 130. For a non-limiting example, the logic engine 120 may transmit whether the input data 112 would generate a FP hardware exception or whether the input data 112 would require a special handling once it is operated on by the FP arithmetic operator. It is appreciated that in some nonlimiting embodiments, the determination 122 may further include the input data 112. However, it is appreciated that the determination 122 including the input data 112 is for illustrative purposes and the convertor engine 130 may independently receive the input data 112, e.g., from the memory 110. The convertor engine 130 in response to the determination by the logic engine 120 may change the value or content of the input data 112. In some non-limiting example, the input data 112 is changed to a maximum supported number or a minimum supported number of the system when the input data 112 is a positive infinity or negative infinity respectively. Moreover, when an input data 112 is an SNAN the input data may be replaced with a zero. As such, the input data 112 as modified by the convertor engine 130 would not generate a FP hardware exception resulting from its original value, e.g., positive infinity, negative infinity, an SNAN, etc. Furthermore, the input data 112 may be manipulated to handle other circumstances such as denormal numbers, QNAN inputs, etc., that may not generate a FP hardware exception but nonetheless may require additional data paths for each FP arithmetic operator to handle the circumstances. In some nonlimiting examples, the convertor engine 130 replaces the input data 112 with zero if the input data 112 is a denormal number or is a QNAN. It is appreciated that the convertor engine 130 may leave the input data 112 unaltered if the input data 112 is neither a QNAN nor if it is an SNAN, positive infinity, negative infinity, or a denormal number.

In some embodiments, the convertor engine 130 outputs data 132 to the ALU 140. It is appreciated that the data 132 may be the same as the input data 112 if it is unaltered or it may be an altered version of the input data 112, as altered by the convertor engine 130. In some embodiments, the ALU 140 is configured to perform a FP arithmetic operation on the received data 132. It is appreciated that no FP hardware exception is generated resulting from the input data 112 being positive infinity, negative infinity, and an SNAN and that no special handling is needed for input data 112 being either a QNAN or a denormal number because the input data 112 is changed to avoid generation of the FP hardware exception or the need for special handling. However, even though the input to the ALU 140 may be a valid number, the output may nonetheless generate an exception or need special handling. For a non-limiting example, two valid numbers may generate a denormal number when added to one another or result in positive or negative infinity when added to one another. Thus, the output of the ALU 140 is monitored for denormal numbers or positive or negative infinity. The output 142 of the ALU 140 is input to the logic engine 120 that is configured to determine whether the output 142 is a denormal number or whether it is positive or negative infinity. If the logic engine 120 determines that the output 142 is neither a denormal number nor it is positive or negative infinity, then the logic engine 120 outputs the content 124 without a need to change its value. In other words, the content 124 has the same value as the output 142 from the ALU 140. On the other hand, if the logic engine 120 determines that the content 142 is either a denormal number or positive infinity or negative infinity then the content 142 is transmitted as content 126 to the convertor engine 130 in order for the content to be modified. For example, if the content 126 is a denormal number then the convertor engine 130 changes the value to zero and outputs the changed value as output 134. In contrast, if the content 126 is positive or negative infinity then the convertor engine 130 changes the value to the maximum supported number or minimum supported number by the system and outputs it as content 134. It is appreciated that the process is repeated for each input data (i.e. operand) for a FP arithmetic operator and its output. It is further appreciated that the content 126 is passed from the logic engine 120 to the convertor engine 130 for illustrative purposes and the embodiments should not be construed as limiting the scope. For example, in some embodiments the convertor engine 130 may receive the content 126 directly from the logic engine 120. In one nonlimiting example, the convertor engine 130 may receive the data directly from the ALU 140. For example, if the logic engine 120 determines that the content 142 is either a denormal number or positive infinity or negative infinity, then the ALU 140 may be signaled to send the content 142 from the ALU 140 to the convertor engine 130 in order for the content to be modified. It is appreciated that the process is repeated for each input data (i.e. operand) for a FP arithmetic operator and its output.

It is appreciated that in some nonlimiting embodiments, the logic engine 120 and the convertor engine 130 may be integrated within a same processing block. It is further appreciated that the communication between the integrated processing block and the ALU 140 may be a bidirectional communication. Moreover, it is appreciated that in some nonlimiting embodiments, the logic engine 120, the convertor engine 130 and the ALU 140 may be integrated within a same processing block, thereby eliminating the need for data communication between different engine blocks.

It is appreciated that since the input data and output data is changed to avoid FP hardware exception generation or requiring special handling, the amount of required resources, power consumption, and the complexity are reduced.

Figure 2:
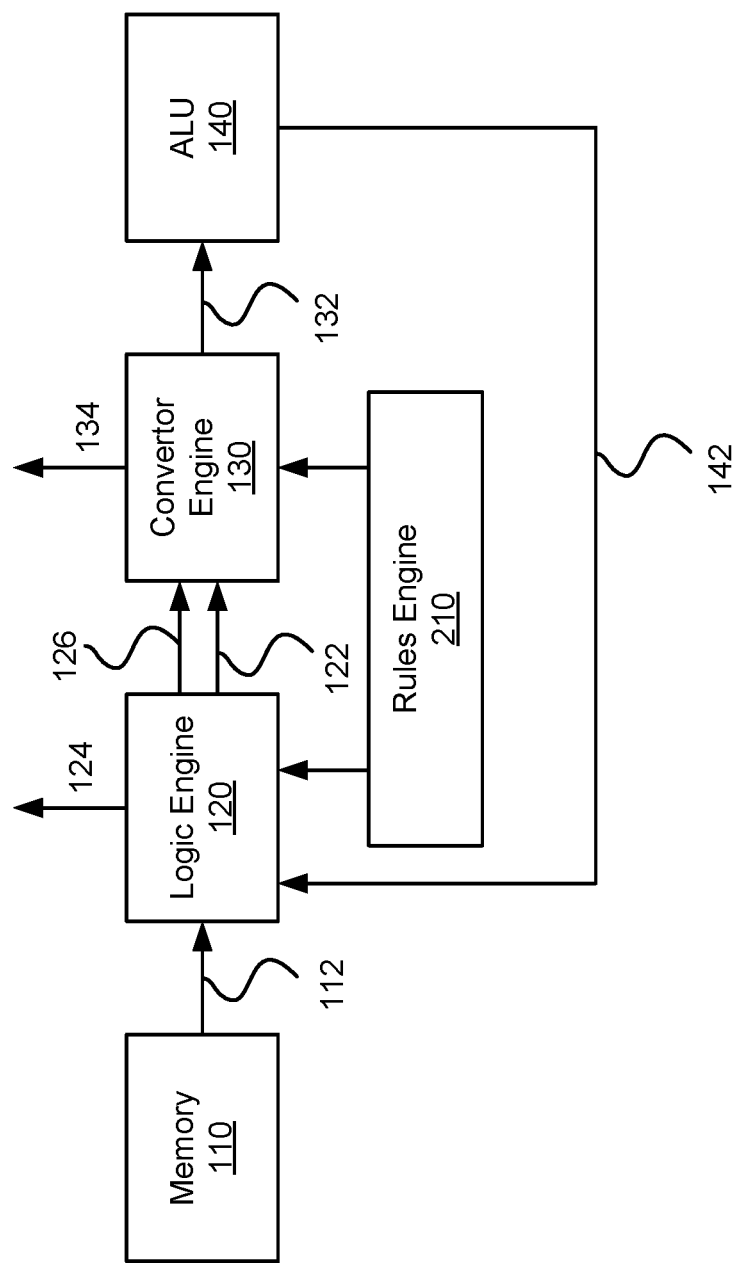
FIG. 2 shows an illustrative example of a programmable architecture configured to efficiently handle FP hardware exception according to one aspect of the present embodiments.

FIG. 2 shows an illustrative example of a programmable architecture configured to efficiently handle FP hardware exception in FP arithmetic operation according to one aspect of the present embodiments. FIG. 2 is substantially similar to that of FIG. 1. However, it is appreciated that in this embodiment, a rules engine 210 may be used to program the logic engine 120 and/or the convertor engine 130. In other words, the circumstances under which the input data for the FP arithmetic operator or its output data is changed may be user programmable. The rules engine 210 enables additional FP hardware exception or special handling to be changed or added for other situations.

Figure 3:
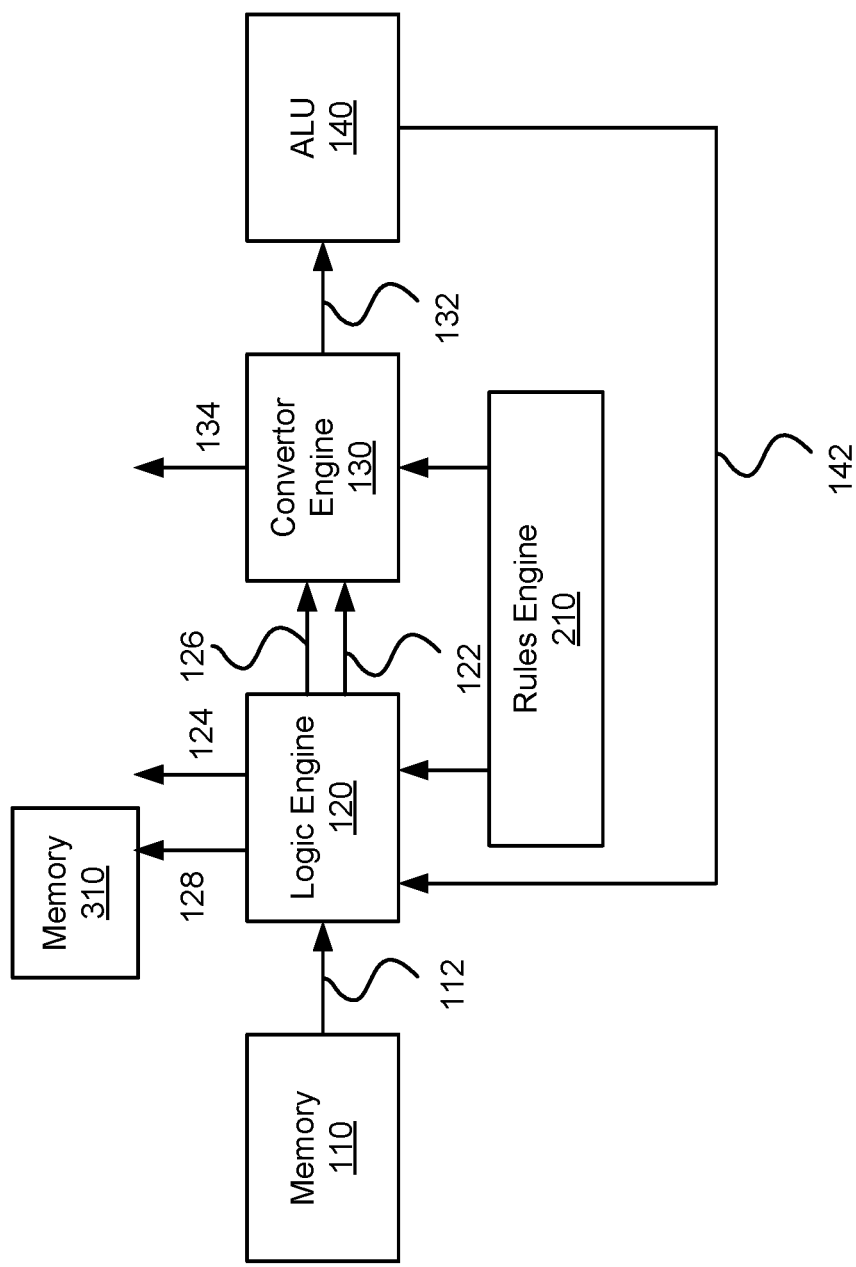
FIG. 3 shows an illustrative example of an architecture configured to efficiently handle FP hardware exception and tracking thereof according to one aspect of the present embodiments.

FIG. 3 shows an illustrative example of an architecture configured to efficiently handle FP hardware exception and tracking thereof according to one aspect of the present embodiments. FIG. 3 is substantially similar to that of FIG. 2. In this embodiment, however, a memory 310 may be used to track when an input data for a FP arithmetic operator or its output is changed. For example, an out-of-bounds flag 128 may be generated and stored in the memory 310 when the input data 112 or output 142 of the ALU 140 is a denormal number, positive infinity, or a negative infinity. In some examples, an un-initialized flag 128 may be generated and stored in the memory 310 when the input data 112 is either a QNAN or an SNAN. The generated flag may be a divide-by-zero flag when the dividend of a division operation is non-zero and divisor is zero.

For illustrative purposes that should not be construed as limiting the scope of the embodiments, various input data for a FP arithmetic operator, e.g., addition, subtraction, or add-reduce, along with changes thereof to the input, and its output, as described above is shown below.

| Inputs | Changed Input | FP Arithmetic Output | Generated Flag |
| --- | --- | --- | --- |
| (±denorm, ±denorm) | (±0, ±0) | ±0 | Out-of-bounds |
| (±denorm, ±inf) | (±0, max/min) | max/min | Out-of-bounds |
| (±denorm, ±qnan) | (±0, ±0) | ±0 | Un-initialized, Out-of-bounds |
| (±denorm, ±snan) | (±0, ±0) | ±0 | Un-initialized, Out-of-bounds |
| (±denorm, ±norm) | (±0, ±norm) | ±norm | Out-of-bounds |
| (±inf, ±inf) | (max/min, max/min) | max/min ±0 | Out-of-bounds |
| (±inf, ±qnan) | (max/min, ±0) | max/min | Un-initialized, Out-of-bounds |
| (±inf, ±snan) | (max/min, ±0) | max/min | Un-initialized, Out-of-bounds |
| (±inf, ±norm) | (max/min, ±norm) | max/min ±norm | Out-of-bounds |
| (±qnan, ±qnan) | (±0, ±0) | ±0 | Un-initialized |
| (±qnan, ±snan) | (±0, ±0) | ±0 | Un-initialized |
| (±qnan, ±norm) | (±0, ±norm) | ±norm | Un-initialized |
| (±snan, ±snan) | (±0, ±0) | ±0 | Un-initialized |
| (±snan, ±norm) | (±0, ±norm) | ±norm | Un-initialized |
| (±norm, ±norm) | (±norm, ±norm) | ±0 max/min ±norm | Out-of-bounds |

For illustrative purposes that should not be construed as limiting the scope of the embodiments, various input data for a FP arithmetic operator, e.g., negation, as described above is shown below.

| Inputs | Changed Input | FP Arithmetic Output | Generated Flag |
| --- | --- | --- | --- |
| ±denorm | ±0 | ±0 | Out-of-bounds |
| ±inf | max/min | max/min | Out-of-bounds |
| ±qnan | ±0 | ±0 | Un-initialized |
| ±snan | ±0 | ±0 | Un-initialized |
| ±norm | ±norm | ±norm | |

For illustrative purposes that should not be construed as limiting the scope of the embodiments, various input data for a FP arithmetic operator, e.g., multiplication, as described above is shown below.

| Inputs | Changed Input | FP Arithmetic Output | Generated Flag |
| --- | --- | --- | --- |
| (±denorm, ±denorm) | (±0, ±0) | ±0 | Out-of-bounds |
| (±denorm, ±inf) | (±0, max/min) | ±0 | Out-of-bounds |
| (±denorm, ±qnan) | (±0, ±0) | ±0 | Un-initialized, Out-of-bounds |
| (±denorm, ±snan) | (±0, ±0) | ±0 | Un-initialized, Out-of-bounds |
| (±denorm, ±norm) | (±0, ±norm) | ±0 | Out-of-bounds |
| (±inf, ±inf) | (max/min, max/min) | max/min | Out-of-bounds |
| (±inf, ±qnan) | (max/min, ±0) | ±0 | Un-initialized, Out-of-bounds |
| (±inf, ±snan) | (max/min, ±0) | ±0 | Un-initialized, Out-of-bounds |
| (±inf, ±norm) | (max/min, ±norm) | max/min ±norm | Out-of-bounds |
| (±qnan, ±qnan) | (±0, ±0) | ±0 | Un-initialized |
| (±qnan, ±snan) | (±0, ±0) | ±0 | Un-initialized |
| (±qnan, ±norm) | (±0, ±norm) | ±0 | Un-initialized |
| (±snan, ±snan) | (±0, ±0) | ±0 | Un-initialized |
| (±snan, ±norm) | (±0, ±norm) | ±0 | Un-initialized |

| Inputs | Changed Input | FP Arithmetic Output | Generated Flag |
|---|---|---|---|
| (±norm, ±norm) | (±norm, ±norm) | ±0 max/ min ±norm | Out-of-bounds Out-of-bounds |

It is appreciated that the multiplication operation may have a 32-bit input/output but the operation may be performed as a 16-bit floating point. In other words, a 32-bit floating point data is converted into a 16-bit floating point number and its value may be clipped to a maximum, minimum or zero. The conversion may cause an out-of-bound exception that is handled according to the embodiments, as described above.

For illustrative purposes that should not be construed as limiting the scope of the embodiments, various input data for a FP arithmetic operator, e.g., maximum, minimum, max-reduce, min-reduce, as described above is shown below.

| Inputs | Changed Input | FP Arithmetic Output | Generated Flag |
|---|---|---|---|
| (±denorm, ±denorm) | (±0, ±0) | ±0 | Out-of-bounds |
| (±denorm, ±inf) | (±0, max/min) | max/ min ±0 | Out-of-bounds Out-of-bounds |
| (±denorm, ±qnan) | (±0, ±0) | ±0 | Un-initialized, Out-of-bounds |
| (±denorm, ±snan) | (±0, ±0) | ±0 | Un-initialized, Out-of-bounds |
| (±denorm, ±norm) | (±0, ±norm) | ±0 ±norm | Out-of-bounds Out-of-bounds |
| (±inf, ±inf) | (max/min, max/min) | max/min | Out-of-bounds |
| (±inf, ±qnan) | (max/min, ±0) | ±0 max/min | Un-initialized, Out-of-bounds Un-initialized, Out-of-bounds |
| (±inf, ±snan) | (max/min, ±0) | ±0 max/min | Un-initialized, Out-of-bounds Un-initialized, Out-of-bounds |
| (±inf, ±norm) | (max/ min, ±norm) | max/ min ±norm | Out-of-bounds |
| (±qnan, ±qnan) | (±0, ±0) | ±0 | Un-initialized |
| (±qnan, ±snan) | (±0, ±0) | ±0 | Un-initialized |
| (±qnan, ±norm) | (±0, ±norm) | ±0 ±norm | Un-initialized Un-initialized |
| (±snan, ±snan) | (±0, ±0) | ±0 | Un-initialized |
| (±snan, ±norm) | (±0, ±norm) | ±0 ±norm | Un-initialized Un-initialized |
| (±norm, ±norm) | (±norm, ±norm) | ±norm | |

For illustrative purposes that should not be construed as limiting the scope of the embodiments, various input data for a FP arithmetic operator, e.g., division, as described above is shown below.

| Inputs | Changed Input | FP Arithmetic Output | Generated Flag |
|---|---|---|---|
| (±denorm, ±denorm) | (±0, ±0) | ±0 | Out-of-bounds |
| (±denorm, ±inf) | (±0, max/min) | ±0 | Out-of-bounds |
| (±denorm, ±qnan) | (±0, ±0) | ±0 | Un-initialized, Out-of-bounds |
| (±denorm, ±snan) | (±0, ±0) | ±0 | Un-initialized, Out-of-bounds |
| (±denorm, ±norm) | (±0, ±norm) | ±0 | Out-of-bounds |
| (±inf, ±inf) | (max/min, max/min) | ±1 | Out-of-bounds |
| (±inf, ±qnan) | (max/min, ±0) | max/min | Un-initialized, Out-of-bounds, Divide-by-zero |
| (±inf, ±snan) | (max/min, ±0) | max/min | Un-initialized, Out-of-bounds, Divide-by-zero |
| (±inf, ±norm) | (max/ min, ±norm) | max/ min ±norm | Out-of-bounds, Divide-by-zero Out-of-bounds, Divide-by-zero |
| (±qnan, ±denorm) | (±0, ±0) | ±0 | Un-initialized, Out-of-bounds |
| (±qnan, ±inf) | (±0, max/min) | ±0 | Un-initialized, Out-of-bounds |
| (±qnan, ±qnan) | (±0, ±0) | ±0 | Un-initialized |
| (±qnan, ±snan) | (±0, ±0) | ±0 | Un-initialized |
| (±qnan, ±norm) | (±0, ±norm) | ±0 | Un-initialized |
| (±snan, ±denorm) | (±0, ±0) | ±0 | Un-initialized, Out-of-bounds |
| (±snan, ±inf) | (±0, max/min) | ±0 | Un-initialized, Out-of-bounds |
| (±snan, ±qnan) | (±0, ±0) | ±0 | Un-initialized |
| (±snan, ±snan) | (±0, ±0) | ±0 | Un-initialized |
| (±snan, ±norm) | (±0, ±norm) | ±0 | Un-initialized |
| (±norm, ±denorm) | (±norm, ±0) | max/min | Out-of-bounds, Divide-by-zero |
| (±norm, ±inf) | (±norm, max/min) | ±0 ±norm | Out-of-bounds Out-of-bounds |
| (±norm, ±qnan) | (±norm, ±0) | max/min | Un-initialized, Divide-by-zero |
| (±norm, ±snan) | (±norm, ±0) | max/min | Un-initialized, Divide-by-zero |
| (±norm, ±norm) | (±norm, ±norm) | ±0 max/ min ±norm | Out-of-bounds Out-of-bounds |

It is appreciated that the division operation may have a 32-bit input/output similar to multiplication, as described above. In other words, the operation may be performed as a 16-bit floating point. In other words, a 32-bit floating point data is converted into a 16-bit floating point number and its value may be clipped to a maximum, minimum or zero. The conversion may cause an out-of-bound exception or a divide by zero exception that is handled according to the embodiments, as described above.

For illustrative purposes that should not be construed as limiting the scope of the embodiments, various input data for a FP arithmetic operator, e.g., FPx to FPy (where x>y), as described above is shown below.

| Inputs | Changed Input | FP Arithmetic Output | Generated Flag |
|---|---|---|---|
| ±denorm | ±0 | ±0 | Out-of-bounds |
| ±inf | max/min (FPx) | max/min (FPy) | Out-of-bounds |
| ±qnan | ±0 | ±0 | Un-initialized |
| ±snan | ±0 | ±0 | Un-initialized |
| ±norm | ±norm | ±0 max/min (FPy) ±norm | Out-of-bounds Out-of-bounds |

For illustrative purposes that should not be construed as limiting the scope of the embodiments, various input data for a FP arithmetic operator, e.g., FPx to FPy (where x<y), as described above is shown below.

| Inputs | Changed Input | FP Arithmetic Output | Generated Flag |
|---|---|---|---|
| ±denorm | ±0 | ±0 | Out-of-bounds |
| ±inf | max/min (FPx) | max/min (FPx) | Out-of-bounds |
| ±qnan | ±0 | ±0 | Un-initialized |
| ±snan | ±0 | ±0 | Un-initialized |
| ±norm | ±norm | ±norm | |

For illustrative purposes that should not be construed as limiting the scope of the embodiments, various input data for a FP arithmetic operator, e.g., FPx to Int, as described above is shown below.

| Inputs | Changed Input | FP Arithmetic Output | Generated Flag |
|---|---|---|---|
| ±denorm | ±0 | ±0 | Out-of-bounds |
| ±inf | max/min | max/min (int) int | Out-of-bounds Out-of-bounds |
| ±qnan | ±0 | ±0 | Un-initialized |
| ±snan | ±0 | ±0 | Un-initialized |
| ±norm | ±norm | ±0 max/min int | Out-of-bounds Out-of-bounds |

It is appreciated that the floating point to integer operation may have a 16-bit input and as such it may not need a 32-bit to 16-bit conversion. In other words, the operation may be performed as a 16-bit floating point and it may be converted to integer, e.g., int9 (as described and as incorporated by reference in its entirety in patent application number <TBD>, filed on <TBD>, entitled "System and Method for INT9 Quantization). The value may be clipped to integer maximum or minimum and it may trigger out-of-bounds exception that is handled according to the embodiments, as described above.

Figure 4:
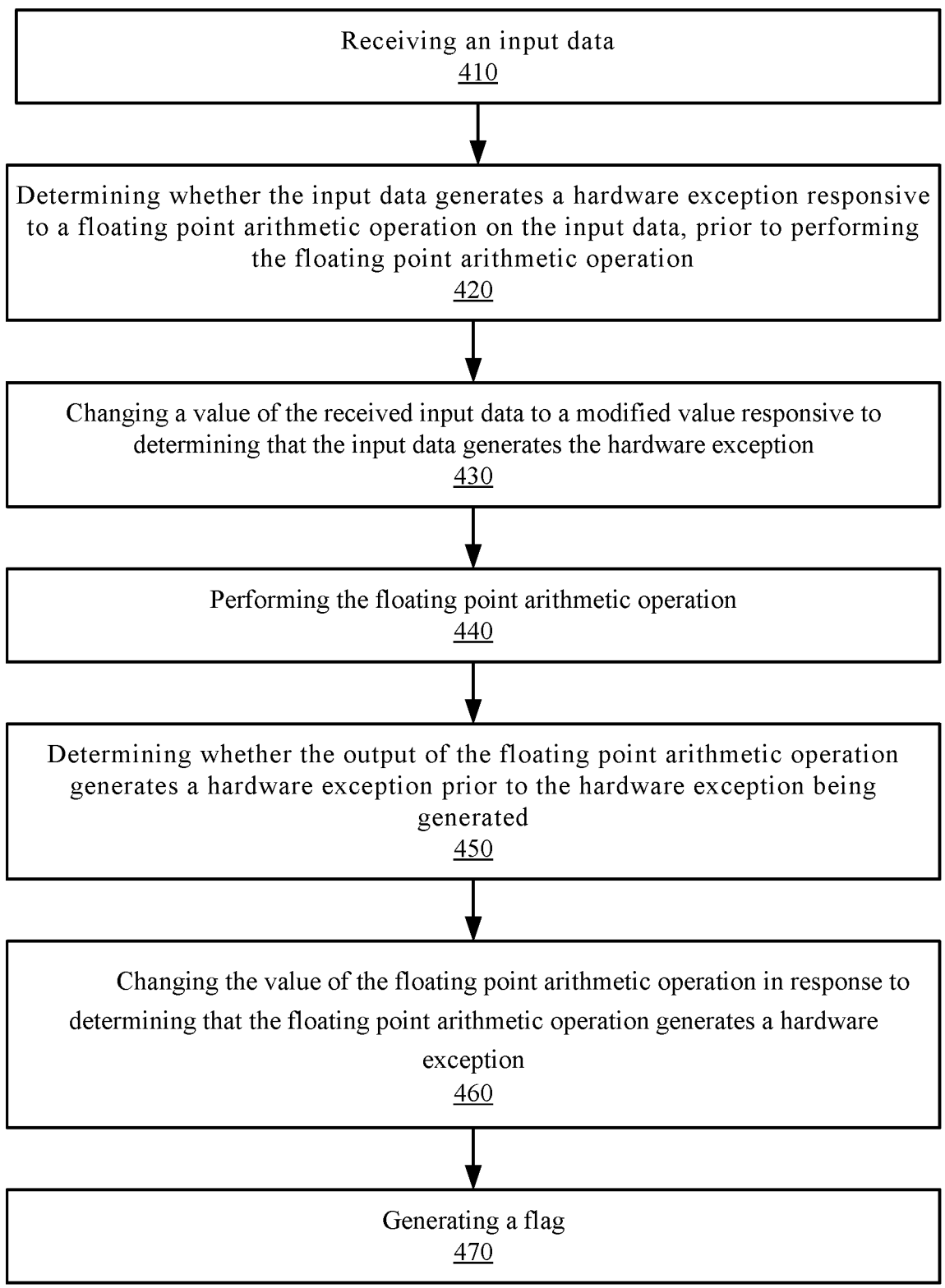
FIG. 4 shows an illustrative example of a method for efficiently handling FP hardware exception according to one aspect of the present embodiments.

FIG. 4 shows an example of a method for efficiently handling FP hardware exception according to one aspect of the present embodiments. At step 410, an input data is received, e.g., a FP number, QNAN, SNAN, denormal number, etc., as described above with respect to FIGS. 1-3. At step 420, it is determined whether the received input data generates a FP hardware exception responsive to a FP arithmetic operation on the input data. It is appreciated that the determination occurs prior to performing the FP arithmetic operation. For example, it is determined whether the input data is a positive infinity, negative infinity, SNAN, etc., as described above with respect to FIGS. 1-3. Furthermore, it is determined whether the input data requires a special handling, e.g., whether the input data is a denormal number, whether the input data is a QNAN, etc., as described above with respect to FIGS. 1-3. In response to determining that the input data generates a FP hardware exception if operated on by a FP arithmetic operator, the input data is changed at step 430. For a non-limiting example, if the input data is positive infinity then the value of the input data is changed to the maximum supported number by the system, if the input data is negative infinity then the value of the input data is changed to the minimum supported number by the system, if the input data is an SNAN then the input data is changed to a zero value, etc., as described above with respect to FIGS. 1-3. Accordingly, the changing of the value of the input data eliminates FP hardware exception generation once the input data is operated on by the FP arithmetic operator. In some embodiments, the value of the input data is also changed if the original input data value requires a special handling. For a non-limiting example, if the input data is a denormal number then the value of the input data is changed to zero, if the input data is QNAN then the value of the input data is changed to zero, etc. At step 440, the input data (i.e. changed value or original value) is operated on by the FP arithmetic operator, as described in FIGS. 1-3. The FP arithmetic operation may be an addition operation, a subtraction operation, an add-reduce operation, multiplication operation, negation operation, maximum operation, minimum operation, max-reduce operation, mMin-reduce operation, division operation, FPx to FPy (where x>y) operation, FPx to FPy (where x<y) operation, FP to Int operation, etc.

At step 450, it is determined whether the output result of the FP arithmetic operation generates a FP hardware exception, before a FP hardware exception is generated. For example, if the output result of the FP arithmetic operator is a positive infinity, a negative infinity, etc., then it is determined that the output result would generate a FP hardware exception, as described in FIGS. 1-3. At step 460, responsive to determining that the output result would generate a FP hardware exception the value of the output result is changed, e.g., positive infinity is changed to a maximum supported number by the system, negative infinity is changed to a minimum supported number by the system, etc. It is further appreciated that in some embodiment, if the output result is a denormal number, the value of the output result is changed to zero.

It is appreciated that at step 470, a flag is optionally generated when the input data is determined to generate a FP hardware exception (prior to generating a FP hardware exception), or when the input data would require a special handling (i.e. QNAN, denormal number, etc.), or when the output result of the FP arithmetic operator would generate a FP hardware exception (prior to the FP hardware exception being generated) or if the output result would require a special handing (i.e. output result is a denormal number), etc. The generated flag may be an out-of-bounds flag if the value is positive infinity, negative infinity, a denormal number, etc. The generated flag may be an un-initialized flag when the data is a QNAN or an SNAN. The generated flag may be a divide-by-zero flag when the dividend of a division operation is non-zero and divisor is zero.

Figure 5:
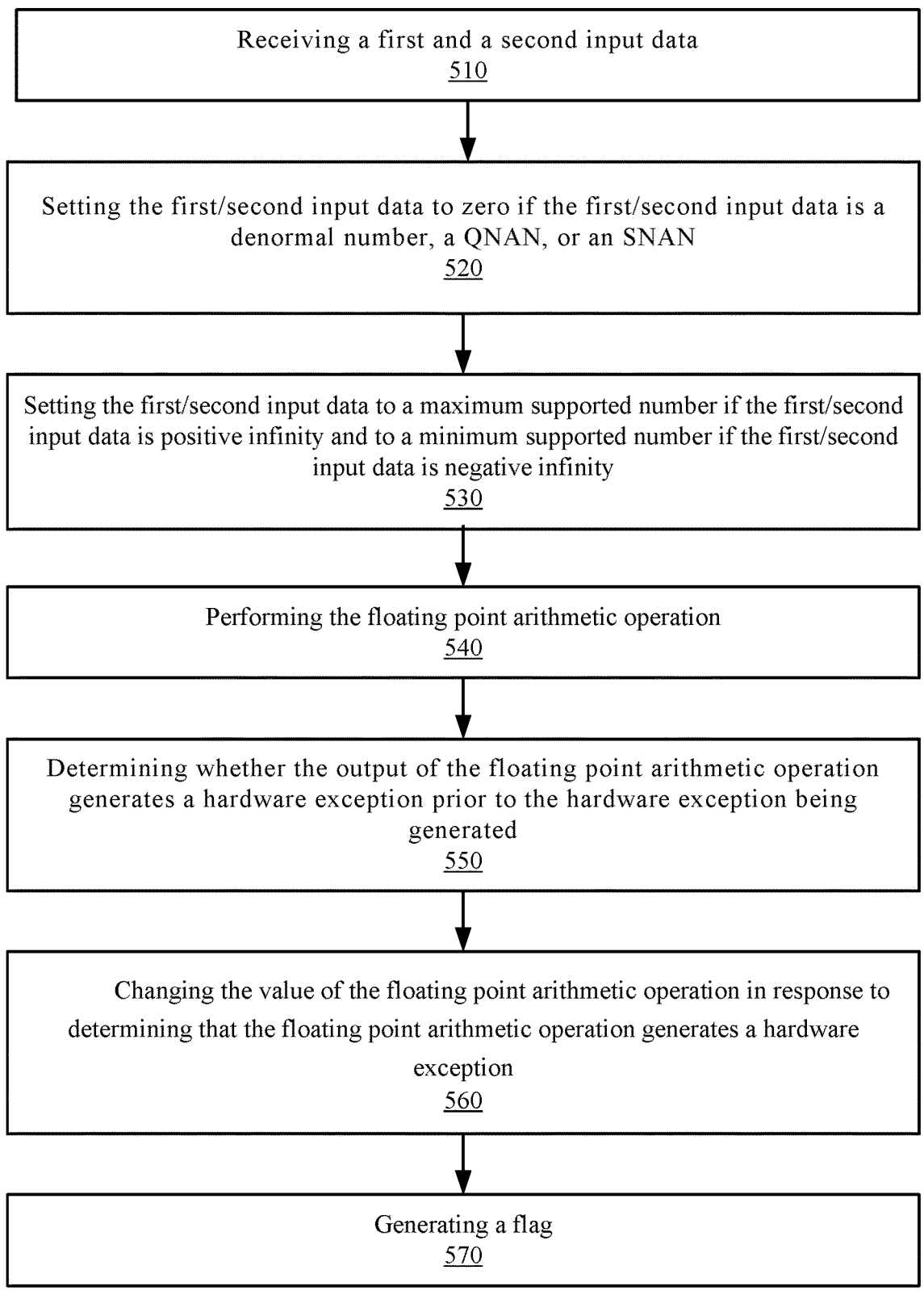
FIG. 5 shows an illustrative example of another method for efficiently handling FP hardware exception according to one aspect of the present embodiments.

FIG. 5 shows an example of another method for efficiently handling FP hardware exception in FP arithmetic operation according to one aspect of the present embodiments. At step 510, a first and a second input data are received for a FP arithmetic operation, e.g., addition, subtraction, add-reduce, multiplication, negation, maximum, minimum, max-reduce, min-reduce, division, FPx to FPy (where x>y), FPx to FPy (where x<y), FP to Int, etc., as described in FIGS. 1-3. At step 520, the first/second input data is set to zero if the first/second input data is a denormal number, a QNAN, an SNAN, etc., as described in FIGS. 1-3. At step 530, the first/second input data is set to a maximum supported value if the first/second input data is positive infinity, and is set to a minimum supported value if the first/second input data is a negative infinity. It is appreciated that if any of the input data is an SNAN, QNAN, denormal, positive infinity, or negative infinity, then a FP hardware exception is generated if operated on by the FP arithmetic operator. At step 540, the first and the second input data (i.e. changed value or original value) are operated on by the FP arithmetic operator, as described in FIGS. 1-3. At step 550, it is determined whether the output result of the FP arithmetic operation generates a FP hardware exception, before a FP hardware exception is generated. For a non-limiting example, if the output result of the FP arithmetic operator is a positive infinity, a negative infinity, etc., then it is determined that the output result would generate a FP hardware exception, as described in FIGS. 1-3. At step 560, responsive to determining that the output result would generate a FP hardware exception the value of the output result is changed, e.g., positive infinity is changed to a maximum supported number by the system, negative infinity is changed to a minimum supported number by the system, etc. It is further appreciated that in some embodiment, if the output result is a denormal number the value of the output result is changed to zero.

It is appreciated that at step 570, a flag is optionally generated when the first or the second input data is determined to generate a FP hardware exception (prior to generating a FP hardware exception), or when the first or the second input data would require a special handling (i.e. QNAN, denormal number, etc.), or when the output result of the FP arithmetic operator would generate a FP hardware exception (prior to the FP hardware exception being generated) or if the output result would require a special handing (i.e. output result is a denormal number), etc. The generated flag may be an out-of-bounds flag if the value is positive infinity, negative infinity, a denormal number, etc. The generated flag may be an un-initialized flag when the input data is QNAN or SNAN. The generated flag may be a divide-by-zero flag when the dividend of a division operation is non-zero and divisor is zero.

Figure 6:
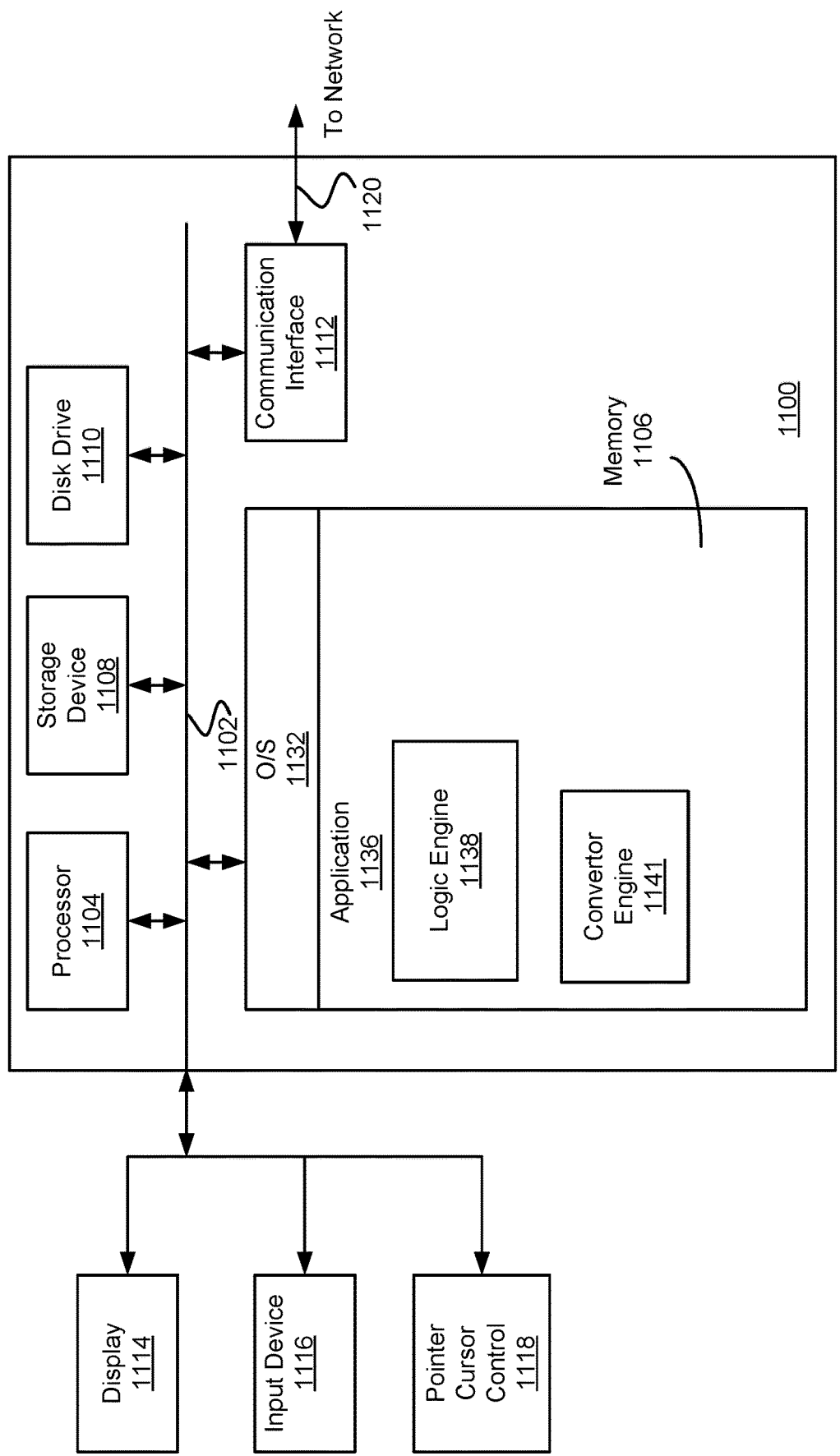
FIG. 6 shows an illustrative example of a block diagram depicting an example of computer system suitable for efficient handling of FP hardware exception according to one aspect of the present embodiments is shown.

Referring now to FIG. 6, a block diagram depicting an example of computer system suitable for efficient handling of FP hardware exception in accordance with some embodiments is shown. In some examples, computer system 1100 can be used to implement computer programs, applications, methods, processes, or other software to perform the above-described techniques and to realize the structures described herein. Computer system 1100 includes a bus 1102 or other communication mechanism for communicating information, which interconnects subsystems and devices, such as a processor 1104, a system memory ("memory") 1106, a storage device 1108 (e.g., ROM), a disk drive 1110 (e.g., magnetic or optical), a communication interface 1112 (e.g., modem or Ethernet card), a display 1114 (e.g., CRT or LCD), an input device 1116 (e.g., keyboard), and a pointer cursor control 1118 (e.g., mouse or trackball). In one embodiment, pointer cursor control 1118 invokes one or more commands that, at least in part, modify the rules stored, for example in memory 1106, to define the electronic message preview process.

According to some examples, computer system 1100 performs specific operations in which processor 1104 executes one or more sequences of one or more instructions stored in system memory 1106. Such instructions can be read into system memory 1106 from another computer readable medium, such as storage device 1108 or disk drive 1110. In some examples, hard-wired circuitry can be used in place of or in combination with software instructions for implementation. In the example shown, system memory 1106 includes modules of executable instructions for implementing an operation system ("O/S") 1132, an application 1136 (e.g., a host, server, web services-based, distributed (i.e., enterprise) application programming interface ("API"), program, procedure or others). Further, application 1136 includes a logic engine 1138 that determines whether the input data would generate a FP hardware exception if operated on by the FP arithmetic operator or if the input data requires a special handling (i.e. denormal number, QNAN, etc.), as described above in FIGS. 1-5. The application 1136 further includes a convertor engine 1141 that changes the value of the input data or output result of the FP arithmetic operator if the logic engine 1138 determines that not changing the value would generate a FP hardware exception or if not changing the value would require a special handling, as described in FIGS. 1-5.

The term "computer readable medium" refers, at least in one embodiment, to any medium that participates in providing instructions to processor 1104 for execution. Such a medium can take many forms, including but not limited to, non-volatile media, volatile media, and transmission media. Non-volatile media includes, for example, optical or magnetic disks, such as disk drive 1110. Volatile media includes dynamic memory, such as system memory 1106. Transmission media includes coaxial cables, copper wire, and fiber optics, including wires that comprise bus 1102. Transmission media can also take the form of acoustic or light waves, such as those generated during radio wave and infrared data communications.

Common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, electromagnetic waveforms, or any other medium from which a computer can read.

In some examples, execution of the sequences of instructions can be performed by a single computer system 1100. According to some examples, two or more computer systems 1100 coupled by communication link 1120 (e.g., LAN, PSTN, or wireless network) can perform the sequence of instructions in coordination with one another. Computer system 1100 can transmit and receive messages, data, and instructions, including program code (i.e., application code) through communication link 1120 and communication interface 1112. Received program code can be executed by processor 1104 as it is received, and/or stored in disk drive 1110, or other non-volatile storage for later execution. In one embodiment, system 1100 is implemented as a hand-held device. But in other embodiments, system 1100 can be implemented as a personal computer (i.e., a desktop computer) or any other computing device. In at least one embodiment, any of the above-described delivery systems can be implemented as a single system 1100 or can be implemented in a distributed architecture including multiple systems 1100.

In other examples, the systems, as described above, can be implemented from a personal computer, a computing device, a mobile device, a mobile telephone, a facsimile device, a personal digital assistant ("PDA") or other electronic device.

In at least some of the embodiments, the structures and/or functions of any of the above-described interfaces and panels can be implemented in software, hardware, firmware, circuitry, or a combination thereof. Note that the structures and constituent elements shown throughout, as well as their functionality, can be aggregated with one or more other structures or elements.

Alternatively, the elements and their functionality can be subdivided into constituent sub-elements, if any. As software, the above-described techniques can be implemented using various types of programming or formatting languages, frameworks, syntax, applications, protocols, objects, or techniques, including C, Objective C, C++, C #, Flex™, Fireworks®, Java™, Javascript™, AJAX, COBOL, Fortran, ADA, XML, HTML, DHTML, XHTML, HTTP, XMPP, and others. These can be varied and are not limited to the examples or descriptions provided.

The foregoing description of various embodiments of the claimed subject matter has been provided for the purposes of illustration and description. It is not intended to be exhaustive or to limit the claimed subject matter to the precise forms disclosed. Many modifications and variations will be apparent to the practitioner skilled in the art. Embodiments were chosen and described in order to best describe the principles of the invention and its practical application, thereby enabling others skilled in the relevant art to understand the claimed subject matter, the various embodiments and the various modifications that are suited to the particular use contemplated.

What is claimed is:

1. A computer-implemented method comprising:
receiving an input data at a floating point arithmetic operating unit, wherein the floating point operating unit is configured to perform a floating point arithmetic operation on the input data;
determining whether the received input data generates a floating point hardware exception responsive to the floating point arithmetic operation on the input data, wherein the determining occurs prior to performing the FP arithmetic operation; and
converting a value of the received input data to a modified value responsive to the determining that the received input data generates the floating point hardware exception, wherein the converting eliminates generation of the floating point hardware exception responsive to the floating point arithmetic operation on the input data, wherein the modified value for the input data is a maximum supported value if the input data is positive infinity and wherein the modified value for the input data is a minimum supported value if the input data is negative infinity.

2. The method of claim 1 further comprising performing the floating point arithmetic operation on the input data with modified value to generate an output result.

3. The method of claim 2, wherein the floating point arithmetic operation is selected from one of an addition operation, a subtraction operation, or an add-reduce operation.

4. The method of claim 2 further comprising determining whether the output result of the FP arithmetic operation generates a floating point hardware exception.

5. The method of claim 4 further comprising setting a value of the output result to zero if a value of the output result is a denormal number.

6. The method of claim 4 further comprising setting a value of the output result to a maximum supported number if a value of the output result is a positive infinity, and setting a value of the output result to a minimum supported number if a value of the output result is a negative infinity.

7. The method of claim 1 further comprising setting a value of the input data to zero if the input data is a denormal number.

8. The method of claim 7 further comprising generating an out-of-bounds flag associated with the denormal number.

9. The method of claim 1 further comprising generating an out-of-bounds flag associated with the input data.

10. The method of claim 1 further comprising generating an out-of-bounds flag associated with the input data.

11. The method of claim 1 further comprising setting a value of the input data to zero if the input data is a qnan (quiet not-a-number).

12. The method of claim 11 further comprising generating an un-initialized flag associated with the input data.

13. The method of claim 1, wherein the input data is an snan (signaling not-a-number) and wherein the modified value is zero.

14. The method of claim 13 further generating an un-initialized flag associated with the input data.

15. A computer-implemented method comprising:
receiving a first input data at a floating point arithmetic operating unit for a FP arithmetic operation;
receiving a second input data at the floating point arithmetic operating unit for the floating point operation;
generating an out-of-bounds flag associated with the input data if the input data is positive infinity or negative infinity;
eliminating a floating point hardware exception responsive to the floating point arithmetic operation on the first and the second input data by performing one or more of: setting the first input data to zero if the first input data is a denormal number, a qnan (quiet not-a-number), or an snan (signaling not-a-number);
setting the first input data to a maximum supported value if the first input data is positive infinity;
setting the first input data to a minimum supported value if the first input data is a negative infinity;
setting the second input data to zero if the second input data is a denormal number, a qnan, or an snan;
setting the second input data to the maximum supported value if the second input data is positive infinity; and
setting the second input data to the minimum supported value if the second input data is a negative infinity.

16. The method of claim 15 further comprising performing the floating point arithmetic operation on the first and the second input data or their modified values to generate an output result.

17. The method of claim 16, wherein the floating point arithmetic operation is selected from one of an addition operation, a subtraction operation, or an add-reduce operation.

18. The method of claim 16 further comprising setting a value of the output result to zero if a value of the output result is a denormal number.

19. The method of claim 16 further comprising setting a value of the output result to the maximum supported number if a value of the output result is a positive infinity, and setting a value of the output result to the minimum supported number if a value of the output result is a negative infinity.

20. The method of claim 15 further comprising generating an out-of-bounds flag associated with the denormal number.

21. The method of claim 15 further comprising generating an un-initialized flag associated with qnan input data.

22. The method of claim 15 further generating an un-initialized flag associated with snan input data.

23. A system comprising:
a logic engine configured to receive an input data for arithmetic operation to be operated on by a floating point arithmetic operating unit, wherein the logic engine is configured to determine whether the received input data generates a floating point hardware exception responsive to the floating point arithmetic operation on the input data, wherein the determining occurs prior to performing the floating point arithmetic operation; and
a convertor engine configured to convert a value of the received input data to a modified value responsive to the determining that the received input data generates the floating point hardware exception, wherein the converting eliminates generation of the FP hardware exception responsive to the floating point arithmetic operation on the input data wherein the modified value for the input data is a maximum supported value if the input data is positive infinity and wherein the modified value for the input data is a minimum supported value if the input data is negative infinity.

24. The system of claim 23 further comprising an arithmetic floating point operator configured to perform the floating point arithmetic operation on the input data with modified value to generate an output result.

25. The system of claim 24, wherein the floating point arithmetic operation is selected from one of an addition operation, a subtraction operation, or an add-reduce operation.

26. The system of claim 24, wherein the logic engine is further configured to determine whether the output result of the floating point arithmetic operation generates a floating point hardware exception.

27. The system of claim 26, wherein the convertor engine is further configured to set a value of the output result to zero if a value of the output result is a denormal number.

28. The system of claim 26, wherein the convertor engine is further configured to set a value of the output result to a maximum supported number if a value of the output result is a positive infinity, and wherein the convertor engine is further configured to set a value of the output result to a minimum supported number if a value of the output result is a negative infinity.

29. The system of claim 23, wherein the convertor engine is further configured to set a value of the input data to zero if the input data is a denormal number.

30. The system of claim 29, wherein the logic engine is further configured to generate an out-of-bounds flag associated with the denormal number.

31. The system of claim 23, wherein the convertor engine is further configured to generate an out-of-bounds flag associated with the input data.

32. The system of claim 23, wherein the logic engine is further configured to generate an out-of-bounds flag associated with the input data.

33. The system of claim 23, wherein the convertor engine is further configured to set a value of the input data to zero if the input data is a qnan (quiet not-a-number).

34. The system of claim 33, wherein the logic engine is further configured to generate an un-initialized flag associated with the input data.

35. The system of claim 23, wherein the input data is an snan (signaling not-a-number) and wherein the modified value is zero.

36. The system of claim 35, wherein the logic engine is configured to generate an un-initialized flag associated with the input data.

* * * * *

UNITED STATES PATENT AND TRADEMARK OFFICE
CERTIFICATE OF CORRECTION

PATENT NO. : 11,301,247 B2  
APPLICATION NO. : 16/864069  
DATED : April 12, 2022  
INVENTOR(S) : Chia-Hsin Chen et al.

Page 1 of 1

It is certified that error appears in the above-identified patent and that said Letters Patent is hereby corrected as shown below:

In the Specification

Column 9 Line 33:
Please delete "< TBD > , filed on < TBD > , entitled " System and Method for"
And replace with 16/862,549, filed on 4/29/2020, entitled " System and Method for Signed and Sealed this
Fourteenth Day of October, 2025

John A. Squires
*Director of the United States Patent and Trademark Office*